United States Patent [19]
Izod et al.

[11] Patent Number: 5,230,854
[45] Date of Patent: Jul. 27, 1993

[54] METHOD FOR REMOVAL OF SPINNING SOLVENT FROM SPUN FIBER

[75] Inventors: Thomas P. Izod, Basking Ridge, N.J.; Scott M. Hacker, New York, N.Y.; Anjana Bose, Randolph, N.J.

[73] Assignee: Allied-Signal Inc., Morris Township, Morris County, N.J.

[21] Appl. No.: 803,883

[22] Filed: Dec. 9, 1991

[51] Int. Cl.$^5$ .............................................. D01F 13/04
[52] U.S. Cl. ................................ 264/203; 264/211.16
[58] Field of Search ............................ 264/203, 211.16

[56] References Cited

U.S. PATENT DOCUMENTS

| | | |
|---|---|---|
| 2,509,279 | 5/1950 | Sisson . |
| 3,737,392 | 6/1973 | Ameen et al. . |
| 4,334,102 | 6/1982 | Decker et al. ................... 568/621 |
| 4,344,908 | 8/1982 | Smith et al. ...................... 264/203 |
| 4,413,110 | 11/1983 | Kavesh et al. ................. 526/348.1 |
| 4,440,711 | 4/1984 | Kwon et al. .................. 264/203 X |
| 4,455,273 | 6/1984 | Harpell et al. ................ 264/203 X |
| 4,536,536 | 8/1985 | Kavesh et al. .................... 524/462 |
| 4,551,296 | 11/1985 | Kavesh et al. ................ 264/203 X |
| 4,713,290 | 12/1987 | Kwon et al. ........................ 428/364 |
| 4,883,628 | 11/1989 | Kwon et al. ..................... 264/178 F |

FOREIGN PATENT DOCUMENTS

| | | |
|---|---|---|
| 64167 | 11/1982 | European Pat. Off. . |
| 3004699 | 10/1987 | Fed. Rep. of Germany . |
| 1100497 | 1/1968 | United Kingdom . |
| 2051667 | 1/1981 | United Kingdom . |

*Primary Examiner*—Leo B. Tentoni

[57] ABSTRACT

This invention relates to a process of extracting a first spinning solvent such as mineral oil from a solution spun polymer fiber such as polyethylene through use of an extraction solvent such as dimethyl diethylene glycol and diethyl diethylene glycol in which the spinning solvent is soluble, which extracting solvent is soluble in a third extraction solvent such as water to a greater extent than the extraction solvent is soluble in the spinning solvent, such that the second extracting solvent can be extracted from a solution of said spinning solvent and said second extraction solvent by said third extracting solvent.

21 Claims, 1 Drawing Sheet

METHOD FOR REMOVAL OF SPINNING SOLVENT FROM SPUN FIBER

BACKGROUND OF THE INVENTION

1. Field of the Invention

This invention relates to a process for removal of spinning solvents from solution spun fibers. More particularly, this invention relates to a process for extraction of a spinning solvent from solution spun fiber in which the solution is spun into a coagulation or gelation liquid.

2. Prior Art

The preparation of fibers through gel spinning and solution spinning process are known. For example, U.S. Pat. No. 4,413,110, 4,455,273, 4,536,536, 4,551,296 describes a process in polyolefin fibers having a molecular weight equal to or greater than 500,000. In these processes, a hot dilute solution (2-30%) of a polyolefin in a relatively non-volatile solvent such as an aliphatic or aromatic hydrocarbon as for example mineral oil, paraffin oil, decalin, polyethylene wax or mixtures thereof is spun. The spun hot solution is cooled forming a gel or coagulate fiber. The resultant gel or coagulate fiber is extracted with another solvent which extracts the spinning solvent and replaces it in the fiber, and is then dried. The fiber is stretched at one or more stages during the process to provide a dried fiber having the desired tenacity and modulus.

Kalb and Penning in Polymer Bulletin, vol. I, pp. 879–80 (1979), Polymer, 2584–90 (1980) and Smook et al. in Polymer Bull., vol. 2, pp. 775–83 (1980) describe a process in which the poly(ethylene) is dissolved in a nonvolatile solvent (paraffin oil) and the solution is cooled to room temperature to form a gel. The gel is cut into pieces, fed to an extruder and spun into a gel filament The gel filament is extracted with hexane to remove the paraffin oil, vacuum dried and then stretched to form the desired fiber.

U.S. Pat. Nos. 4,440,711, 4,713,290, and 4,883,628 describe processes for the gel spinning fibers formed from polymers formed from vinyl alcohol and acrylonitrile. Polymer of a molecular weight of over 500,000 is spun as a dilute solution (2-15%) in a relatively non-volatile solvent such as glycerin, dimethylsulfoxide, dimethylformamide, and ethylene carbonate The resultant solvent is extracted with a volatile solvent such as methanol and water, the extracted fiber is dried Upon stretching at one or more stages during the process, fibers of tenacity above 5 g/denier and modulus above 100 g/denier are produced.

Zwick et al. in Soc. Chem. Ind., London, Monograph No. 30, pp. 188–207 (1968) describe the spinning of polyvinyl alcohol by a Phase Separation technique said to differ from earlier Wet Spinning, Dry Spinning and Gel Spinning techniques. The reference indicates that the earlier systems employ 10-20%, 25-40% and 45-55% polymer concentrations, respectively, and that they differ in the manner in which low molecular weight materials (solvents such as water) are removed. The reference also indicates some earlier systems to be restricted in spinneret hole size, attenuation permitted or required, maximum production speed and attainable fiber properties.

The Phase Separation process described in Zwick et al. (see also UK Patent Specification 1,100,497) employs a polymer content of 10-25% (broadly 5-25% in the Patent which covers other polymers as well) dissolved at high temperatures in a one or twocomponent solvent (low molecular weight component) system that phase separates on cooling. This phase separation took the form of polymer gelation and solidification of the solvent (or one of its components), although the latter is indicated in the Patent to be optional. The solution was extruded through apertures at the high temperature through unheated air and wound up at high speeds hundreds or thousands of times greater than the linear velocity of the polymer solution through the aperture. Thereafter the fibers were extracted to remove the concluded or exterior solvent phase, dried and stretched. An earlier, more general description of Phase Separation Spinning is contained in Zwick Applied Polymer Symposia. no 6, pp. 109–49 (1967).

Modifications in the spinning of hot solutions of ultra-high molecular weight poly(ethylene) (see Examples 21-23 of UK 1,100,497) have been reported by Smith and Lemstra and by Pennings and coworkers in various articles and patents including German Offen 3004699 (Aug. 21, 1980); UK Application 2,051,667 (Jan. 21, 1981); Polymer Bulletin, vol. 1, pp. 879–880 (1979) and vol. 2, pp. 775–83 (1980); and Polymer 2584–90 (1980).

The Zwick et al article states the polyvinyl alcohol content of 10-25% in the polymer solution to be optimal, at least in the system explored in most detail where the solvent or a component of the solvent solidified on the cooling to concentrate the poly(vinyl alcohol) in the liquid phase on cooling before the poly(vinyl alcohol) gels. Unlike the systems used in the Kavesh et al applications and Smith and Lemstra patents, all three versions of Zwick's Phase Separation process take up the fiber directly rom the air gap, without a quench bath, such that the draw-down occurred over a relatively large length of cooling fibers.

U.S. Pat. No. 4,771,616 relates to an apparatus and method for extraction of a material from a running length of fiber. This method comprises continuously moving the fiber through a conduit while simultaneously flowing a solvent for the material through the conduit with the conduit having a length and cross sectional area sufficient to facilitate extraction of the desired amount of the material The flow is preferred to be countercurrent to the movement of the fiber.

A prior method to extract mineral oil from poly(ethylene) solution spun fiber and a method to manufacture such fiber is disclosed in U.S. Pat. No. 4,413,110 hereby incorporated by reference. A process to purify both the solvent and the mineral oil for recycle and/or reuse is disclosed in pending U.S. patent application Ser. No. 811,123 filed Dec. 19, 1985, hereby incorporated by reference. A prior art method for treatment of filamentary materials in a tube is found in U.S. Pat. No. 2,509,279.

U.S. Pat. No. 4,334,102 describes a method for removing liquid hydrocarbons from polyether solvents such as dimethyl ether of polyethylene glycol. The method comprises the steps of mixing the solution with an aqueous salt solution, removing at low temperature an organic layer containing liquid hydrocarbons, heating the remaining aqueous layer to a higher temperature where it separates into a second organic layer containing polyether solvent and an aqueous salt solution. The aqueous salt solution is cooled and recycled to mix with additional polyether solvent solution at the low temperature. The process is particularly applicable to removing liquid hydrocarbons which accumulate in recirculating polyether solvents used for absorption of acid gases from feedstocks such as natural gas, synthetic natural gas, ammonia synthesis gas and refinery gas.

SUMMARY OF THE INVENTION

One aspect of this invention relates to a process of extracting a spinning solvent from a fiber containing said solvent, said process comprising the steps of:

(a) extracting a continuous length of a fiber containing a first spinning solvent with a second extracting solvent, said second extracting solvent selected such that said first spinning solvent is soluble or substantially soluble in said second extracting solvent and said second extracting solvent is soluble in a third extracting solvent which is immiscible in said spinning solvent, said relative solubility of said second extracting solvent in said spinning solvent and in said third extracting solvent being such that said third extracting solvent is capable of extracting all or a portion of said second extracting solvent from a first solution of said second extracting solvent and said spinning solvent, said extracting for a time sufficient to form a fibrous structure containing said second extraction solvent, which structure is free of or substantially free of said first spinning solvent and a first solution comprising said extracted first spinning solvent and said second extracting solvent;

(b) extracting said first solution with said third extracting solvent for a time sufficient to form a heterogeneous liquid mixture comprising two distinct liquid phases, a first liquid phase comprising predominantly said first spinning solvent and a second liquid phase comprising predominantly a second solution comprising said second extracting solvent and said third solvent;

(c) separating said first and second phases of step b; and (d) separating said second extracting solvent from said third extracting solvent and recycling said second extracting solvent to extracting step (a) and said third extracting solvent to extracting step (b).

Yet another aspect of this improved solution spinning process of the type which comprises the steps of forming a solution of a polymer of fiber forming molecular weight in a first spinning solvent; extruding said solution through an aperture, said solution being at a temperature no less than a first temperature upstream of the aperture and being substantially at the first concentration both upstream and downstream of said aperture; cooling the solution adjacent to and downstream of the aperture to a second temperature below the temperature at which a rubbery gel is formed, forming a gel containing first solvent of substantially indefinite length; extracting the gel containing first solvent with a second, volatile solvent for a sufficient contact time to form a fibrous structure containing second solvent, which structure is substantially free of first solvent and is of substantially indefinite length drying the fibrous structure containing said second solvent to form axerogel of substantially indefinite length free of first and second solvent; and stretching at least one of the gel containing the first solvent and, the xerogel, said improvement comprising the steps of:

(a) extracting a continuous length of a fiber containing a first spinning solvent with a second extracting solvent, said second extracting solvent selected such that said first spinning solvent is soluble or substantially soluble in said second extracting solvent and said second extracting solvent is soluble in a third extracting solvent which is immiscible in said spinning solvent, said relative solubility of said second extracting solvent in said spinning solvent and in said third extracting solvent being such that said third extracting solvent is capable of extracting all or a portion of said second extracting solvent from a first solution of said second extracting solvent and said spinning solvent, said extracting for a time sufficient to form a fibrous structure containing said second extraction solvent, which structure is free of or substantially free of said first spinning solvent and a first solution comprising said extracted first spinning solvent and said second extracting solvent;

(b) extracting said first solution with said third extracting solvent for a time sufficient to form a heterogeneous liquid mixture comprising two distinct liquid phases, a first liquid phase comprising predominantly said first spinning solvent and a second liquid phase comprising predominantly a second solution comprising said second extracting solvent and said third solvent;

(c) separating said first and second liquid phases;

(d) recycling said first spinning liquid phase to said solution forming step;

(e) separating said second extracting solvent from said third extracting solvent; and (f) recycling said second extracting solvent to said spinning solvent extracting step (a) and said third extracting solvent to said extracting step (b).

BRIEF DESCRIPTION OF THE DRAWINGS

The invention will be more fully understood and further advantages will become apparent when reference is made to the following detailed description of the invention and the accompanying drawings in which.

DETAILED DESCRIPTION OF THE INVENTION

Figure 1:
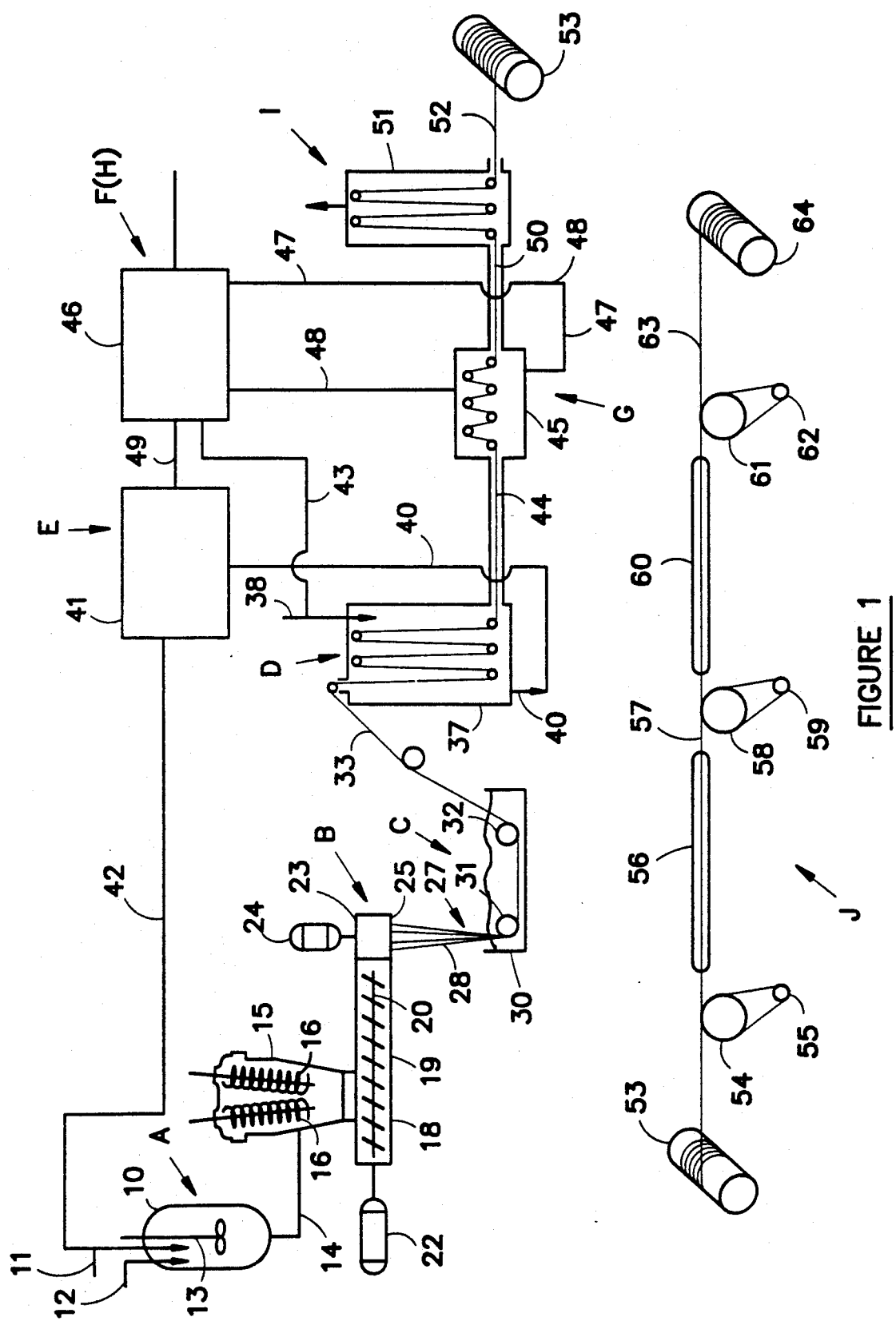
FIG. 1 is a schematic illustration of an embodiment of this invention.

In the broadest aspects, this invention relates to a process for extracting the spinning solvent from polymeric fiber spun from a solution of a polymer in the solvent. In this process, a continuous length of the fiber containing the first spinning solvent is contacted with a second extracting solvent which is a non-solvent for said polymer of the fiber, but which is a solvent for the spinning solvent contained in the fiber and which is soluble in a third extracting liquid which is not a solvent for said first spinning solvent wherein the relative solubility of said second extracting solvent in said first spinning solvent and said third extracting solvent are such that said third extracting solvent is capable of extracting all or a portion of said second extracting solvent from a solution of said first spinning solvent and said second extracting solvent to form a two phase system wherein one phase comprises predominantly said spinning solvent and in which the other phases comprises predominantly a solution comprising said second and third extracting solvents.

As used herein, a fiber is an elongated body, the length dimension of which is much greater than the dimensions of width and thickness. Accordingly, the term fiber includes a yarn, thread, filaments, both multifilament and monofilaments, and ends of yarn containing multiple filaments, tapes, ribbons, strips and the like having regular or irregular crosssections; and "solvent"

shall mean fluid that is either liquid or vapor and which will extract or remove in any manner the spinning liquid from the solution spun fiber.

Means for contacting the liquid containing fiber with the extracting solvent is not critical, any conventional solvent extracting means can be used. For example, the extracting solvent and fiber can be contacted by counter current techniques or co-current techniques. In the preferred embodiments of the invention, the extracting solvent and the fiber containing the spinning solvent are contacted using the apparatus and method of U.S. Pat. No. 4,771,616.

The extracting solvent and the fiber containing the spinning solvent are contacted for a time and to an extent sufficient to extract all or substantially all of the spinning solvent from the fiber and to replace it with the extracting solvent. Extraction times may vary widely and are such that the desired amount of spinning solvent is extracted. Extraction times will depend on a number of factors as for example the extraction temperature, the solubility of the spinning solvent in the extracting solvent and the like. Usually, extraction times will vary from a few minutes or seconds up to hours or days. Preferred extraction times are from about 1 minute to about 24 hours, more preferred extraction times are from about 1 minute to about 30 minutes, and most preferred extraction times are from about 1 minute to about 10 minutes.

Useful extraction temperatures vary widely depending on a number of factors, in particular the solubility of the spinning solvent in the extracting solvent at a given temperature. Preferably, the extraction step is carried out at ambient temperature, i.e., from about 20° C. to about 30° C.

The number of contacts may vary widely and will depend to a significant extent on the mutual solubilities of the first spinning solvent and the second extracting solvent at the contacting temperature. For example, in those instances where the mutual solubility and fiber porosity are high and the amount of spinning solvent contained in the fiber is low, the desired amount of spinning solvent may be removed in as few as one contacting cycle. However, on the other hand where mutual solubilities and fiber porosities are low and the amount of spinning solvent in the fiber is high, more than one contact cycle may be required to extract the desired amount of spinning solvents from the fiber. In general, the contacting times and cycles are selected such that the residual spinning solvent remaining in the fiber is not more than about 15% by weight of the fiber, preferably not more than about 10% by weight of the fiber, more preferably not more than about 5% by weight of the fiber and most preferably not more than about 1.5% by weight of the fiber.

The second extraction solvent may vary widely provided that it is a solvent for the spinning solvent at some temperature, is soluble in a third extracting solvent which is not soluble in the spinning solvent and whose relative solubilities in said spinning solvent and said third extraction solvent are such that said third extracting solvent is capable of extracting the second extraction solvent from a solution comprising the spinning solvent and the second extracting solvent. A further characteristic is that the second extracting solvent is a non-solvent for the polymer forming the fiber at the extraction temperature. Extraction solvents having the desired characteristics can be identified through use of solubility studies. The extraction solvent will depend to the most significant extent on the spinning solvent. The spinning solvent will vary depending on the polymer forming the fibers. For example, in those instances where the fiber is formed from poly(vinyl alcohol) the spinning solvent is preferably an aliphatic and aromatic alcohol such as a hydrocarbon polyol or an alkylene ether polyol having a boiling point (at 101 kPa) between about 150° C. and 300° C. Such solvents include ethylene glycol, glycerin, propylene glycol, glycerol, diethylene glycol and triethylene glycol. In those instances where the fiber is formed from poly (acrylonitrile), useful spinning solvents include dimethyl sulfoxide, dimethyl formamide, and the like. Similarly, where the polymer forming the fiber is a polyolefin, such poly(ethylene), poly(propylene) and copolymers of ethylene and propylene, spinning solvents are preferably aliphatic and aromatic hydrocarbons such as mineral oil, paraffin oil, decalin, polyethylene wax and mixtures thereof. In those instances, useful extractive solvents having the desired characteristics may be identified through routine temperature/solubility studies.

In the preferred embodiments of the invention where the fiber is formed from a polyolefin (preferably poly(ethylene)) and where the spinning solvent is a hydrocarbon preferably mineral oil, paraffin oil or decalin the extraction solvent is preferably a polyether solvent which is liquid under process conditions. Preferred polyether solvents are ethers of polyalkylene glycols and monoalkyl and dialkyl derivatives thereof with alkyl moieties of 1 to about 5 carbon atoms (especially methyl and ethyl) and alkylene or alkylene glycol wherein alkylene moieties are individually of 2 to about 6 carbon atoms (especially ethylene).

Useful polyether solvents are described in U.S. Pat. No. 3,737,392. More preferred extraction solvents have flash points (open cup) $\geq 200°$ F., boiling points at 760 mm Hg $\geq 190°$ C., vapor pressures at 25° C. $\leq 0.4$ mm² Hg and include no chlorine atoms in the solvent structure. Illustrative of such more preferred solvents are poly(propylene glycol), molecular weight from about 425 to about 1200; tetraethylene glycol dimethyl ether; triethylene glycol dimethyl ether; diethylene glycol dimethyl ether; diethylene glycol monobutyl ether; diethylene glycol monoethyl ether; diethylene glycol monomethyl ether; diethylene glycol divinyl ether; diethylene glycol monoisobutyl ether; diethylene glycol dibutyl ether; triethylene glycol; tetraethylene glycol; propylene glycol monomethyl ether; diethylene glycol monopropyl ether, diethylene glycol tert-butyl methyl ether, and diethylene glycol diethyl ether.

More preferred groups of polyether solvents are polyethylene glycol ethers and polypropylene glycol ethers of the formulas:

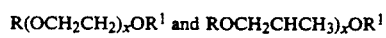

wherein x is an integer from 1 to about 8, and R and $R^1$ are the same or different and are hydrogen or alkyl having from 1 to about 4 carbon atoms, and mixtures thereof. More preferred solvents are those of the formula:

where x is an integer from about 2 to about 5 and R and $R^1$ are the same or different and are methyl, ethyl, propyl or butyl. Most preferred solvents are $CH_3(OCH_2CH_2)_2OCH_3$ and $C_2H_5(OCH_2CH_2_2OC_2H_5$, with $C_2H_5(OCH_2CH_2)_2OC_2H_5$ being the extraction solvent of choice.

Useful preferred polyether solvents may be prepared by conventional methods such as by acid catalyzed polymerization of propylene oxide, ethylene oxide and mixtures of propylene oxide and ethylene oxide. Such solvents may also be obtained from commercial sources. For example, such materials can be obtained from Wyandotte Corporation under the trade name Pluracol polyethylene glycol E 200, E 300, E 400, and E 600 and Pluracol poly propylene glycol P 410; and from Dow Corporation under the trade name Polyglycol P 400. Also, glycol ether solvents can be obtained from Eastman Kodak, e.g. Ektasolv DB and Ektasolv DP and from Union Carbide, e.g. Butyl Carbitol and Oxy Chem, e.g. Diethylene Glycol DB and Diethylene Glycol HB.

The polymer for the fiber may vary widely, the only requirement is that the polymer is soluble in spinning solvent. Illustrative of useful polymers are polyamides and their copolymers such as poly(metaphenylene isophthalamide), poly(p-phenylene terephthalamide), copolyamide of 30% hexamethylene diammonium isophthalate and 70% hexamethylene iammonium adipate, copolyamide of 30% bis(amidocyclohexyl) methylene, terephthalic acid and caprolactam, poly (hexamethylene adipamide) nylon (66), poly (6-aminohexanoic acid) nylon (6), poly ii-aminoundecancoic acid) nylon (11), poly(hexamethylene sebacamide) (nylon (6,10) and the like; polymers and copolymers formed by the polymerization of $\alpha,\beta$-unsaturated olefins such as polyacrylonitrile), poly(vinyl alcohol), poly(acrylic acid), polyolefins as for example poly(ethylene) and poly(propylene), copolymers of vinyl acetate and vinyl chloride; and polyesters such as poly(butylene terephthalate), poly(ethylene terephthalate) and poly(1,4-cyclohexane dimethylene terephthalate) Preferred polymers are polyamides and polymers of $\alpha,\beta$-unsaturated monomers such as polyolefins (especially polypropylene and poly ethylene), poly (vinyl alcohol) and poly(acrylonitrile).

Poly(ethylene) is the polymer of choice. As used herein, the term "poly(ethylene)" shall mean a predominantly linear polyethylene material that may contain minor amounts of chain branching or comonomers not exceeding 5 modifying units per 100 main chain carbon atoms, and that may also contain admixed therewith not more than about 50 wt% of one or more polymeric additives such as alkene-1-polymers, in particular low density poly(ethylene), poly(propylene) or poly(butylene), copolymers containing mono-olefins as primary monomers, oxidized polyolefins, graft polyolefin copolymers and polyoxymethylenes, or low molecular weight additives such as anti-oxidants, lubricants, ultraviolet screening agents, colorants and the like which are commonly incorporated by reference.

The polymers are of fiber forming molecular weight. Such molecular weights for the various fiber forming polymers as well known in the art and will not be described in great detail. For example, in the case of preferred poly(ethylene), poly(propylene), poly(acrylonitrile) and poly(vinyl alcohol), suitable polymers are those having a molecular weight of at least about 150,000, preferably at least about 1,000,000, more preferably from about 1,000,000 to about 5,000,000 and most preferably from about 2,000,000 to about 5,000,000.

Solvent containing fibers for use in this invention can be conveniently prepared by gel or solution spinning techniques. Illustrative of such procedures are those described in U.S. Pat. Nos, 4,457,985; 4,137,394; 4,336,138; 4,440,711; 4,713,290; 4,551,296; 4,599,276 and 4,535,027, German Off. 3,004,699, GB 2051667; and EPA 64,167 all of which are hereby incorporated by reference. Accordingly, these processes will not be described in any great detail. Of these processes, fibers formed by the spinning processes of U.S. Pat. Nos. 4,413,110, 4,455,273, 4,536,536, 4,551,296, 4,440,771, 4,713,290 and 4,883,628 are preferred.

In these preferred processes, a suitable polymer is dissolved in a suitable non-volatile first spinning solvent usually in an amount of from about 5 to about 15% by weight of the solution, preferably from about 4 to about 10% by weight of the solution. The fiber containing the spinning solution is extruded through a spinning aperture at a temperature no less than a first temperature upstream of the aperture at substantially the same concentration upstream and downstream of the aperture and cooling the solution adjacent to and downstream of the aperture to a second temperature below the temperature at which a rubbery gel is formed, forming a gel containing the first spinning solvent of substantially indefinite length.

The first spinning solvent should be non-volatile under the processing conditions. This is necessary in order to maintain essentially constant concentration of solvent upstream and through the aperture (die) and to prevent non-uniformity in liquid content of the gel fiber or film containing first solvent. Preferably, the vapor pressure of the first solvent should be no more than 80 kPa (four-fifths of an atmosphere) at 180° C., or at the first temperature. Suitable first spinning solvents for useful polymers as for example polyethylene, poly(acrylonitrile) and poly (vinyl alcohol) are described above. For example, useful spinning solvents for polyvinyl alcohol include aliphatic and aromatic alcohols of the desired non-volatility and solubility for the polymer such as hydrocarbon polyols and alkylene ether polyols having a boiling point (at 101 kPa) between about 150° C. and about 300° C., such as ethylene glycol, propylene glycol, glycerol, diethylene glycol and trimethylene glycol. Suitable first spinning solvents for polyolefins such as poly(ethylene) include aliphatic and aromatic hydrocarbons such as decalin, mineral oil, parafin wax, polyethylene waxes and mixtures thereof. The first spinning solvent is preferably mineral oil. The polymer may be present in the first solvent at a first concentration which is preferably selected from a relatively narrow range, e.g. 2 to 15 weight percent, preferably 4 to 10 weight percent; however, once chosen, the concentration should not vary adjacent to the die or otherwise prior to cooling to the second temperature. The concentration should also remain reasonably constant over time (i.e. length of the fiber or film).

The first temperature is chosen to achieve complete dissolution of the polymer in the first spinning solvent. The first temperature is the preferably minimum temperature at any point between where the solution is formed and the die face, and must be greater than the gelation temperature for the polymer in the solvent at the first concentration. For polyethylene in mineral oil at 5 to 15% concentration; the gelation temperature is approximately from about 100° C. to about 130° C. Therefore, a preferred first temperature can be between about 180° C. and about 250° C., and a more preferred first temperature is from about 200° C. to 240° C. Similarly, for poly(vinyl alcohol) in glycerine at a concentration of from about 5 to about 15% by weight of the first spinning solution, the gelation temperature is approximately about 25 to about 100° C. Therefore, a preferred first temperature for polyvinyl alcohol can be between about 130° C. and about 250° C., more preferably from about 170 to about 230° C. While temperatures may vary above the first temperature at various points upstream of the die face, excessive temperatures causative of polymer degradation should be avoided. To assure complete solubility, a first temperature is chosen whereat the solubility of the polymer exceeds the first concentration and is typically at least 20% greater. The second temperature is chosen whereat the first solvent-polymer system behaves as a gel, i.e., the system has a yield point and reasonable dimensional stability for subsequent handling. Cooling of the extruded polymer solution from the first temperature to the second temperature is preferably accomplished at a rate sufficiently rapid to form a gel fiber which is of substantially the same polymer concentration as existed in the polymer solution. Preferably the rate at which the extruded polymer solution is cooled from the first temperature to the second temperature is preferably at least 50° C. per minute.

A preferred means of rapid cooling to the second temperature involves the use of a quench bath containing a liquid into which the extruded polymer solution falls after passage through an air gap (which may be an inert gas). Normally, however, the quench liquid and the first spinning solvent have only limited miscibility. For example, in the case of the preferred poly(vinyl alcohol) fiber where the spinning solvent is preferably glycerol, the quench liquid is preferably a liquid such as paraffin oil. Similarly, for the preferred polyacrylonitrile fiber where the spinning solvent is preferably dimethyl sulfoxide suitable quenching solvent is preferably a liquid such as a mixture of water and dimethyl sulfoxide. In the case of the most preferred poly(ethylene) fiber, there the spinning solvent is preferably a hydrocarbon (preferably mineral oil), the quench liquid is preferably water.

The preferred polyether solvents used as extracting solvents in this invention may also function as quenching liquids. For example, where the spinning solvent is substantially soluble in the extraction solvent at elevated temperature but insoluble at lower temperatures, the spun fiber can be quenched by contacting the spun fiber with the solvent at a lower temperature where the spinning solvent is insoluble in the poly(ether) solvent and a temperature sufficiently low to quench the spun fiber. Thereafter, the fiber may be contacted with the solvent at elevated temperature to extract the spinning solvent.

Some stretching during cooling to the second temperature is not excluded from the present invention, but the total stretching during this stage should not normally exceed 10:1. As a result of those factors, the gel fiber formed upon cooling to the second temperature consists of a continuous polmeric network highly swollen with solvent.

If an aperture of circular cross section (or other cross section without a major axis in the plane perpendicular to the flow direction more than 8 times the smallest axis in the same plane, such as oval, Y-or X-shaped aperture) is used, then both gels will be gel fibers, the xerogel will be an xerogel fiber and the thermoplastic article will be a fiber. The diameter of the aperture is not critical, with representative apertures being between 0.25 mm and 5 mm in diameter (or other major axis). The length of the aperture in the flow direction should normally be at least 10 times the diameter of the aperture (or other similar major axis), preferably at least 15 times and more preferably at least 20 times the diameter (or other similar major axis).

If an aperture of rectangular cross section is used, then both gels will be gel films, the xerogel will be a xerogel film and the thermoplastic article will be a film. The width and height of the aperture are not critical, with representative apertures being between 2.5 mm and 2 m in width (corresponding to film width), between 0.25 mm and 5 mm in height (corresponding to film thickness). The depth of the aperture (in the flow direction) should normally be at least 10 times the height of the aperture, preferably at least 15 times the height and more preferably at least 20 times the height.

After the spinning solvent has been extracted to the desired extent (preferably less than about 15.0%, more preferably less than about 5.0% and most preferably less than about 1.5% by wgt of the fiber), the extracted fiber and the solution comprising the first spinning solvent and the second extraction solvent are separated. The extracted fiber maybe dried using conventional drying techniques, if the extraction solvent is sufficiently volatile. However, if the extracting solvent is not sufficiently volatile, the fiber may be extracted with a washing solvent which is more volatile than the extracting solvent and which is miscible with the extracting solvent. Washing replaces the extracting solvent in the gel with the more volatile washing solvent. Suitable washing solvents include water, low molecular weight alcohols such as methanol and ethanol. With the preferred poly(ether) solvents, water is the preferred washing solvent primarily for convenience.

Once the fibrous structure containing the washing or extraction solvent is formed, it is then dried under conditions where the washing or extraction solvent is removed leaving the solid network of polymer substantially intact. By analogy to silica gels, the resultant material is called herein a "xerogel" meaning a solid matrix corresponding to the solid matrix of a wet gel, with the liquid replaced by gas (e.g. by an inert gas such as nitrogen or by air). The term "xerogel" is not intended to delineate any particular type of surface area, porosity or pore size.

Stretching may be performed upon the gel fiber after cooling to the second temperature or during or after extraction. Alternatively, stretching of the xerogel fiber may be conducted, or a combination of gel stretch and xerogel stretch may be performed. The stretching may be conducted in a single stage or it may be conducted in two or more stages. The first stage stretching may be conducted at room temperatures or at an evaluated temperature. Preferably the stretching is conducted in two or more stages with the last of the stages performed at a temperature between about 120° C. and about 160° C. Most preferably the stretching is conducted in at least two stages with the last of the stages performed at a temperature between about 135° C. and about 150° C. Such temperatures may be achieved with heated tubes or with other heating means such as heating blocks or steam jets.

In the preferred embodiments of the invention, the solution comprising the second extracting solvent and the first spinning solvent is treated with a third extraction solvent to separate the solution into a first portion which is predominantly said first spinning solvent (more than about 70%, preferably more than about 85%, more preferably more than about 95% and most preferably more than about 99% by weight of the first portion) and a second portion which contains at least about 5% of the second extracting solvent in the solution (preferably at least about 25%, more preferably at least about 40% and most preferably at least about 50% by weight of the second portion).

Methods of separating the solution into the first and second portions may vary widely and any conventional procedure may be used as for example the procedure of USP No. 4.334.102. In the preferred embodiments of the invention where the second extracting solvent is a polyether such as triethylene glycol, triethylene glycol dimethyl ether, diethylene glycol diethyl ether, tetraethylene glycol dimethyl ether, or diethylene glycol dimethyl ether, the first spinning solvent and the second extraction solvent are separated by extraction of the second extraction solvent from the solution with a third extraction solvent which is a solvent for the second extraction solvent and a non-solvent for the first spinning solvent forming a heterogeneous mixture of two liquid phases, one liquid phase being predominantly the first spinning solvent and the other liquid phase being a solution comprising said second and third extraction solvent. The first portion containing predominantly the first spinning solvent can be recycled to form polymer fiber spinning solution.

Liquids useful as the third extraction solvent may vary widely provided that they provide this function. Preferred third extraction solvents are those which may be separated from the second extraction solvent by some suitable solvent separation technique which incorporates the lower critical solution temperature properties of said second and third extracting solvents, e.g. diethyl carbitol and water temperatureinduced phase separation, and also including distillation, extraction, and the like to allow for recycling of the second extraction solvent to the first spinning solvent extraction step. More preferred third extraction solvents are those which can be separated from the second extraction solvent by distillation. Such third extraction solvents will usually have a boiling point at least about 80° C., preferably at least about 110° C., more preferably at least about 150° C. less than that of the second extraction solvent. Illustrative of such preferred third extraction solvents are water, an alcohol such as ethanol, methanol and the like. More preferred third extraction solvents are water and alcohols, and the most preferred third extraction solvent is water.

Mixture of the second and third extraction solvents are separated through use of a suitable separation technique (as for example, those described above), such that the level of third extraction solvent in the second extraction solvent is such that the second extraction solvent is of sufficient purity to be recycled to the first spinning solvent extraction step. Likewise, the level of the second extraction solvent in the third extraction solvent is such that the third extraction solvent is of sufficient purity to be recycled to the extraction step involving the separation of first spinning solvent from second extraction solvent. After separation, the second extraction solvent can be directly recycled to the fiber extraction step or recycled subject to further optional treatment as for example drying with some drying agent as for example molecular sieves the third extraction solvent can be recycled to the second extraction solvent extraction step.

Fibers prepared in accordance with the process of this invention can be used for conventional purposes for which fibers are used using conventional fiber processing techniques. For example, where the fibers formed from ultra high molecular weight linear polyethylene, such fibers can be used in the fabrication of impact resistant articles as for example those described in U.S. Pat. Nos. 4,916,000; 4,623,574; 4,403,012; 4,457,985; 4,650,710; 4,681,792; 4,737,401; 4,543,286; 4,563,392 and 4,501,856.

The following examples are presented to more particularly illustrate the invention and are not to be construed as limitations thereon.

EXAMPLE I

FIG. 1, illustrates in schematic form a first embodiment of the present invention, wherein a first mixing vessel 10 is shown, which is fed with an ultra high molecular weight polymer 11 such as polyethylene of weight average molecular weight at least 500,000 and frequently at least 750,000, and to which is also fed mineral oil via fed line 12. First mixing vessel 10 is equipped with an agitator 13. The residence time of poly(ethylene) and mineral oil in first mixing vessel 10 is sufficient to form a slurry containing some dissolved poly(ethylene) and some relatively finely divided poly(ethylene) particles, which poly(ethylene)/mineral oil slurry is removed in line 14 to an intensive mixing vessel 15. Intensive mixing vessel 15 is equipped with helical agitator blades 16. The residence time and agitator speed in intensive mixing vessel 15 is sufficient to convert the poly(ethylene)/mineral oil slurry into a solution. It will be appreciated that the temperature in intensive mixing vessel 15, either because of external heating, heating of polyethylene/mineral oil slurry 14, heat generated by the intensive mixing, or a combination of the above is sufficiently high (e.g. about 200° C.) to permit the poly(ethylene) to be completely dissolved in the mineral oil at the desired concentration (generally between 5 to 10 percent poly(ethylene) by weight of solution). From the intensive mixing vessel 15, the solution is fed to an extrusion device 18, containing a barrel 19 within which is a screw 20 operated by motor 22 to deliver the polyethylene solution at reasonably high pressure to a gear pump and housing 23 at a controlled flow rate. A motor 24 is provided to drive gear pump 23 and extrude the poly(ethylene) solution, still hot, through a spinnerette 25 comprising a plurality of apertures, which may be circular, X-shaped, or, oval-shaped, or in any of a variety of shapes having a relatively small major axis in the plane of the spinnerette when it is desired to form fibers, and having a rectangular or other shape with an extended major axis in the plane of the spinnerette when it is desired to form films. The temperature of solution in the mixing vessel 15, in extrusion device 18 and at spinnerette 25 should all equal or exceed a first temperature (e.g. about 200° C.) chosen to exceed the gelation temperature (approximately about 100 to about 130° C.) for poly(ethylene) in mineral oil.

The temperature may vary (e.g. about 220° C., about 210° C. and about 200° C.) or may be constant (e.g. about 220° C.) from the mixing vessel 15 to extrusion device 18 to the spinnerette 25. At all points, however, the concentration of polyethylene in the solution is preferably substantially the same. The number of apertures, and thus the number of fibers formed, is not critical, with convenient numbers of apertures being 16, 120, 240.

From the spinnerette 25, the poly(ethylene) solution passes through an air gap 27, optionally enclosed and filled with an inert gas such as nitrogen, and optionally provided with a flow of gas to facilitate cooling. A plurality of gel fibers 28 containing mineral oil pass through the air gap 27 and into a quench bath 30 containing any of a variety of liquids, so as to cool the fibers, both in the air gap 27 and in the quench bath 30, to a second temperature at which the solubility of the poly(ethylene) in the mineral oil is relatively low, such that the polyethylene/mineral oil system solidifies to form a gel. It is preferred that the quench liquid in quench batch 30 is water. While some stretching in the air gap 27 is permissible, it is preferably less than about 10:1.

Rollers 31 and 32 in quench bath 30 operate to feed the fiber through the quench bath, and preferably operate with little or no stretch. In the event that some stretching does occur across rollers 31 and 32, some mineral oil exudes out of the fibers and can be collected as a top layer in quench bath 30.

From quench bath 30, the cool first gel fibers 33 pass to a solvent extraction device 37 where a second extraction solvent is fed through line 38 and is maintained in device 37 at some temperature. The second extraction solvent is a polyether solvent which is a solvent for the first spinning solvent mineral oil. The second extraction solvent is also a solvent for water and is a non-solvent for poly(ethylene). The second extraction solvent is preferably monoalkyl or alkyl ether of a polyalkylene glycol such as diethylene glycol diethyl ether. The second extraction solvent extracts the mineral oil spinning solvent from the gel fiber forming a fibrous structure containing less than about 15.0% by weight of mineral oil by weight of the fiber, and more preferably less than about 1.5% by weight of mineral oil by weight of the fiber, and a first solution of the mineral oil first spinning solvent and the polyether second extracting solvent. The solution is conveyed via solution out line 40 to solvent separator 41 where the solution is extracted with a third extraction solvent, preferably water, forming a heterogeneous liquid mixture comprising two liquid phases, a first phase comprising the spinning solvent (at least about 80 wt %, preferably at least about 90 wt %, more preferably at least about 95 wt % the most preferably at least about 99 wt % by weight of the first phase), and a second phase comprising a solution of the second and third extraction solvents. The immiscible phases are separated and the spinning solvent phase is conveyed to mixer 10 by way of lines 42 and 11. The second phase is conveyed to extraction solvent recovery device 46 by way of line 49 where the second and third extraction solvents are separated by some suitable method as for example temperature induced phase separation, for example when the second extraction is diethylene glycol diethyl ether and the third extraction solvent is water. The separated second extraction solvent is conveyed to solvent extraction device 37 via lines 43 and 38 and the third extraction solvent is conveyed to solvent separation 41 by way of line 49(a). Fibrous structure 44 which is conducted out of solvent extraction device 37 contains substantially only the extracting solvent and relatively little mineral oil. The fibrous structure 44 may have shrunken somewhat compared to the first gel fibers 33. Fibrous structure 44 is then conveyed to washing chamber 45 where structure 44 containing the second extraction solvent is washed with a washing solvent in which the second extraction solvent is soluble (such as the third extraction solvent) to remove the second extraction solvent from structure 44. The washing solvent preferably has a volatility of less than that of the extraction solvent (boiling point preferably less than about 100° C.). Preferred washing solvents are low molecular weight alcohols such as methanol and ethanol, and water. In the preferred embodiments of the invention, the washing solvent is the same liquid as the third extraction solvent. The most preferred washing solvent is water.

Structure 44 is washed for a time and extent sufficient to remove up to about 5% by weight, preferably up to about 1% by weight, more preferably up to about 0.2% by weight of the second extracting solvent (based on the original concentration of the second extracting solvent) from structure 44. Because in the preferred embodiments the washing solvent and the second extracting solvent are the same, the solution of the washing solvent and the third extraction solvent is conveyed to solvent recovery unit 46 by way of line 47 where the washing solvent and extraction solvent are separated. After washing, the mixture comprised of washing solvent and second extracting solvent can be recycled to working chamber 45 one or more times by a convenient means as for example a line (not depicted) until the concentration of second extracting solvent in the washing solvent is too high for effective removal of second extracting solvent from structure 44 and thereafter conveyed to unit 46. However, in those embodiments of the invention where the washing solvent and the third extracting solvent are different, the solution is carried to a washing solvent second extracting solvent separation chamber (not depicted), where the solvents are separated and the washing solvent conveyed to washing chamber 45 and the second extraction solvent conveyed to device 37 by some suitable means, as for example a line (not depicted).

Washed fibrous structure 50 is conveyed to drying device 51. In drying device 51, the washing solvent is evaporated from the fibrous structure 50, forming essentially unstretched xerogel fibers which are taken up on spool 53.

From spool 53, or from a plurality of such spools if it is desired to operate the stretching line at a slower feed rate than the take up of spool 53 permits, the fibers are fed over driven feed roll 54 and idler roll 55 into a first heated tube 56. Sufficient heat is applied to the tube 56 to cause the fiber temperature to be between about 120 and about 140° C. The fibers are stretched at a relatively high draw ratio (e.g. about 5:1) so as to form partially stretched fibers 57 taken up by driven roll 58 and idler roll 59. From rolls 58 and 59, the fibers are taken through a second heated tube 60, heated so as to be at somewhat higher temperature, e.g. from about 130 to about 160° C. and are taken up by driven take-up roll 61 and idler roll 62, operating at a speed sufficient to impart a stretch ratio in heated tube 60 as desired, e.g. about 1.8:1. The twice stretched fibers 63 produced in this first embodiment are taken up on take-up spool 64.

With reference to the ten process steps of the preferred embodiment of the present invention described in this example, it can be seen that the solution forming step A is conducted in mixers 13 and 15. The extruding step B is conducted with devices 18 and 23, and especially through spinnerette 25. The cooling step C is conducted in air gap 27 and quench bath 30. Extraction step D is conducted in solvent extraction device 37. Extraction solvent and spinning solvent separation step E is conducted in separation 41. Second and third extraction solvents separation step F is conducted in unit 46. Fiber washing step G is conducted in washing chamber 45. Washing solvent and extraction solvent recovery step H is carried out in unit 46 in the preferred embodiments where the washing solvent and third extracting solvent are the same. Drying step I is conducted in drying device 51. Stretching step J is conducted in elements 53-64 and especially in heated tubes 56 and 60. It will be appreciated, however, that various other parts of the system may also perform some stretching, even at temperatures substantially below those of heated tubes 56 and 60. Thus, for example, some stretching (e.g. 2:1) may occur within quench bath 30, within solvent extraction device 37, within washing unit 45, within drying device 51 or between solvent extraction device 37 and drying device 51.

EXAMPLE II

A sample of gel spun SPECTRA® fiber (10.2211 gm, approximately 76% mineral oil) was extracted with 50 gm of diethyl carbitol at 50° C. for thirty minutes with periodic agitation. This process was repeated twice more. The fiber was then rinsed four times with ambient temperature (23-24° C.) water (15 minutes each stage) and dried at 110° C. in a vacuum oven for 15 minutes. The weight of the dried fiber was 2.4572 gm. The residual oil in the fiber was determined to be 0.3 wt % by infrared analysis.

EXAMPLE III

A sample of gel spun SPECTRA® fiber (10.4084 gm, approximately 76% mineral oil) was extracted three times with 50 gm diethyl carbitol at room temperature for thirty minutes each. The fiber was rinsed four times with ambient temperature water, 15 minutes for each stage. The fiber was then dried in a vacuum oven for 15 minutes at 110° C. The weight of the dried fiber was 2.5091 gm. Residual mineral oil left in the fiber is 0.8 wt % by infrared analysis.

What is claimed is:

1. A process for extracting a first spinning solvent from a solution spun fiber, said process comprises the steps of:
  (a) extracting a continuous length of a fiber containing a first spinning solvent with a second extracting solvent, said second extracting solvent selected such that said first spinning solvent is soluble or substantially soluble in said second extracting solvent and said second extracting solvent is soluble or substantially soluble in a third extracting solvent which is immiscible in said first spinning solvent, said second extracting solvent having a solubility in said first spinning solvent and having a solubility in said third extracting solvent such that said third extracting solvent is capable of extracting all or a portion of said second extracting solvent from a first solution of said second extracting solvent and said first spinning solvent, said extracting of said first spinning solvent by said second extracting solvent for a time sufficient to form a fibrous structure containing said second extracting solvent, which structure is free of or substantially free of said first spinning solvent and a first solution comprising said extracted first spinning solvent and said second extracting solvent;
  (b) extracting said first solution with said third extracting solvent for a time sufficient to form a heterogeneous liquid mixture comprising two distinct liquid phases, a first liquid phase comprising predominantly said first spinning solvent and a second liquid phase comprising predominantly a second solution comprising said second extracting solvent and said third extracting solvent;
  (c) separating said first and second phases of step (b); and
  (d) separating said second extracting solvent from said third extracting solvent and recycling said second extracting solvent to extracting step (a) and said third extracting solvent to extracting step (b).

2. An improved process for solution spinning of polymeric fibers of the type which comprises the steps of forming a solution of a polymer of fiber forming molecular weight and a spinning solvent; extruding said solution through an aperture, said solution being at a temperature no less than a first temperature upstream of the aperture and being substantially at a first concentration both upstream and downstream of said aperture; cooling the solution adjacent to and downstream of the aperture to a second temperature below the temperature at which a rubbery gel is formed, forming a gel containing first solvent of substantially indefinite length; extracting the gel containing first solvent with a second, volatile solvent for a sufficient contact time to form a fibrous structure containing second solvent, which structure is substantially free of first solvent and is of substantially indefinite length; drying the fibrous structure containing second solvent to form a xerogel of substantially indefinite length free of first and second solvent; and stretching at least one of the gel containing the first solvent, the fibrous structure containing the second solvent and, the xerogel, said improvement comprising the steps of:
  (a) extracting a continuous length of a fiber containing a first spinning solvent with a second extracting solvent, said second extracting solvent selected such that said first spinning solvent is soluble or substantially soluble in said second extracting solvent and said second extracting solvent is soluble or substantially soluble in a third extracting solvent which is immiscible in said spinning solvent, said second extracting solvent having a solubility in said spinning solvent and having a solubility in said third extracting solvent such that said third extracting solvent is capable of extracting all or a portion of said second extracting solvent from a first solution of aid second extracting solvent and said first spinning solvent, said extracting of said first spinning solvent by said second extracting solvent for a time sufficient to form a fibrous structure containing said second extracting solvent, which structure is free of or substantially free of said first spinning solvent and a first solution comprising said extracted first spinning solvent and said second extracting solvent;
  (b) extracting said first solution with said third extracting solvent for a time sufficient to form a heterogeneous liquid mixture comprising two distinct liquid phases, a first liquid phase comprising predominantly said first spinning solvent and a second liquid phase comprising predominantly a second solution comprising said second extracting solvent and a third solvent;
  (c) separating said first and second liquid phases;

(d) recycling said first liquid phase comprising predominantly said first spinning solvent to said solution forming step;

(e) separating said second extracting solvent from said third extracting solvent; and (f) recycling said second extracting solvent to said spinning solvent extracting step (a) and said third extracting solvent to said extracting step (b).

3. An improved process according to claim 2 wherein said polymer is a polyolefin.

4. An improved process according to claim 3 wherein said polyolefin is polyethylene.

5. An improved process according to claim 4 wherein said spinning solvent is a hydrocarbon.

6. An improved process according to claim 5 wherein said hydrocarbon is mineral oil.

7. An improved process according to claim 5 wherein said second extraction solvent is a polyether solvent which is liquid under process conditions.

8. An improved process according to claim 7 wherein said polyether solvent is selected from the group consisting of ethers of polyalkylene glycols and monoalkyl and dialkyl derivatives thereof, wherein the alkyl moieties have from 1 to abut 5 carbon atoms, and aklylene or alylene glycol moieties wherein the alkylene moieties individually include from 2 to about 6 carbon atoms.

9. an improved process according to claim 8 wherein said poly ether solvent has a flash point (open cup)$\geq 200°$ F., a boiling point at 760 mm Hg$\geq 190°$ C., and a vapor pressure at 25° C.$\leq 0.4$ mm Hg.

10. An improved process according to claim 9 wherein said spinning solvent is mineral oil.

11. An improved process according to claim 10 wherein said second extraction solvent is selected from the group consisting of polyethylene glycol ethers and polypropylene glycol ethers of the formulas:

$R(OCH_2CH_2)O_xOR^1$ or $R(OCH_2CH(CH_3))_xOR^1$ wherein:

x is an integer from 1 to about 8; and

R and $R^1$ are the same or different and are hydrogen or alkyl of from 1 to about 4 carbon atoms.

12. An improved process according to claim 11 wherein said second extraction solvent is selected from the group consisting of polyethylene glycol ethers of the formula:

$R—(OCH_2CH_2)_xOR^1$ wherein:

x is an integer from 2 to about 5; and

R and $R^1$ are the same or different and are methyl, ethyl, propyl, or butyl.

13. An improved process according to claim 12 wherein said second extraction solvent is selected from the group consisting of dimethyl diethylene glycol and diethyl diethylene glycol.

14. An improved process according to claim 13 wherein said second extraction solvent is diethyl diethylene glycol.

15. An improved process according to claim 12 wherein said third extraction solvent is water or an alcohol having from 1 to 4 aliphatic carbon atoms.

16. An improved process according to claim 15 wherein said third extraction solvent is water.

17. An improved process according to claim 15 wherein said recycled first liquid phase comprises at least about 85 weight % of said first spinning solvent by weight of said first liquid phase.

18. An improved process according to claim 17 wherein said recycled first liquid phase comprises at least about 9 5weight % of said first spinning solvent by weight of said first liquid phase.

19. An improved process according to claim 18 wherein said recycled first liquid phase comprises at least about 99 weight % of said first spinning solvent by weight of said first liquid phase.

20. An improved process according to claim 18 wherein said extracting of said first spinning solvent with said second extracting solvent is carried out at a temperature of from about 20° C. to about 30° C.

21. an improved process according to claim 20 wherein said second extracting solvent and said third extracting solvent are substantially soluble at a third temperature and are substantially insoluble at a fourth temperature and wherein said first solution is contacted by said third extracting solvent at said third temperature the two phases separated and wherein said second extracting solvent is separated from said third extracting solvent by subjecting said second liquid phase to said fourth temperature.

* * * * *

UNITED STATES PATENT AND TRADEMARK OFFICE
CERTIFICATE OF CORRECTION

PATENT NO. : 5,230,854
DATED : July 27, 1993
INVENTOR(S) : Izod et al.

It is certified that error appears in the above-indentified patent and that said Letters Patent is hereby corrected as shown below:

Col. 16, line 51, "aid" should read --said--

Col. 17, line 25, "abut" should read --about--

Col. 17, line 29, "an" should read --An--

Col. 18, line 29, "9 5weight %" should read --95 weight %--

Col. 18, line 39, "an" should read --An--

Signed and Sealed this

Eighth Day of March, 1994

Attest:

BRUCE LEHMAN

Attesting Officer

Commissioner of Patents and Trademarks